(12) United States Patent
Liu et al.

(10) Patent No.: US 12,003,462 B2
(45) Date of Patent: Jun. 4, 2024

(54) METHOD FOR DETERMINING SENSING INFORMATION IN COMMUNICATION TRANSMISSION AND RELATED DEVICE

(71) Applicant: HUAWEI TECHNOLOGIES CO., LTD., Guangdong (CN)

(72) Inventors: Chenchen Liu, Shenzhen (CN); Huangxun Chen, Hong Kong (CN); Xiao Han, Shenzhen (CN); Rui Du, Shenzhen (CN); Meihong Zhang, Shenzhen (CN); Yunbo Li, Shenzhen (CN); Qian Zhang, Hong Kong (CN); Jia He, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 17/668,207

(22) Filed: Feb. 9, 2022

(65) Prior Publication Data
US 2022/0263640 A1 Aug. 18, 2022

Related U.S. Application Data

(63) Continuation of application No. PCT/CN2020/084785, filed on Apr. 14, 2020.

(30) Foreign Application Priority Data

Aug. 12, 2019 (CN) .......................... 201910741496.0

(51) Int. Cl.
*H04L 5/00* (2006.01)

(52) U.S. Cl.
CPC .......... *H04L 5/0094* (2013.01); *H04L 5/0044* (2013.01); *H04L 5/0051* (2013.01); *H04L 5/006* (2013.01)

(58) Field of Classification Search
None
See application file for complete search history.

(56) References Cited

U.S. PATENT DOCUMENTS 10,673,506 B1 * 6/2020 Dash .................... H04B 7/0626
2016/0037484 A1 2/2016 Kwon et al.
(Continued)

FOREIGN PATENT DOCUMENTS

| CN | 104640073 A | 5/2015 |
| CN | 106712909 A | 5/2017 |

(Continued)

OTHER PUBLICATIONS

Office Action in Chinese Appln. No. 201910741496.0, dated Jul. 19, 2022, 13 pages (with English translation).
(Continued)

*Primary Examiner* — Diane L Lo
(74) *Attorney, Agent, or Firm* — Fish & Richardson P.C.

(57) ABSTRACT

A method includes, in accordance with some implementations, sending, a measurement station, a trigger frame to a signal source station, where the trigger frame carries pilot format information, and the pilot format information is used to indicate a sending time point of a signal frame triggered by the trigger frame, a quantity of times for sending the signal frame, and a transmission mode of pilot information in the signal frame. The measurement station receives an illumination frame from the signal source station, where the illumination frame is the signal frame triggered by the trigger frame. The measurement station analyzes pilot information in the illumination frame to obtain sensing information in the illumination frame, where the sensing information is used to indicate physical information of an object surrounding the signal source station and the measurement station.

12 Claims, 15 Drawing Sheets

(56) References Cited

U.S. PATENT DOCUMENTS

| | | | |
|---|---|---|---|
| 2017/0325178 A1 | 11/2017 | Verma et al. | |
| 2019/0074876 A1* | 3/2019 | Kakishima | H04B 7/0417 |
| 2019/0296817 A1* | 9/2019 | Wu | H04B 7/0413 |
| 2020/0305231 A1* | 9/2020 | Sadeghi | H04B 7/0626 |

FOREIGN PATENT DOCUMENTS

| | | |
|---|---|---|
| CN | 106899978 A | 6/2017 |
| CN | 107432005 A | 12/2017 |
| CN | 108141261 A | 6/2018 |
| WO | 2018076788 A1 | 5/2018 |

OTHER PUBLICATIONS

IEEE Std 802.11ah™—2016, "Part 11: Wireless LAN Medium Access Control (MAC) and Physical Layer (PHY) Specifications; Amendment 2: Sub 1 GHz License Exempt Operation," IEEE Computer Society, Dec. 2016, 594 pages.

IEEE P802.11ax ™/D2.2, "Part 11: Wireless LAN Medium Access Control ,(MAC) and Physical Layer (PHY) Specifications; Amendment 6: Enhancements for High Efficiency WLAN," IEEE Computer Society, Feb. 2018, 620 pages.

vStd 802.11n™—2009 "Part 11: Wireless LAN Medium Access Control (MAC) and Physical Layer(PHY) Specifications; Amendment 5:Enhancements for Higher Throughput," IEEE Computer Society, Sep. 2009, 536 pages.

PCT International Search Report and Written Opinion issued in International Application No. PCT/CN2020/084785 on Jul. 17, 2020, 17 pages (with English translation).

\* cited by examiner

FIG. 6(a) Frame format of a trigger frame

| B0 | B3 | B4 | B15 | B16 | B17 | B20 B21 | B23 |
|---|---|---|---|---|---|---|---|
| Trigger frame type | | Uplink length | | Trigger frame flag bit | Carrier sensing requirement | Uplink bandwidth | GI and LTE type | ... |

Bit quantity: 4 | 12 | 1 | 1 | 2 | 2

| B26 | B27 | B28 B33 | B35 | B36 | B52 | B54 | B63 |
|---|---|---|---|---|---|---|---|
| Uplink space-time block coding | Low-density parity-check code extra symbol segment | Access point transmit power | Pre-forward error correction code padding factor | Packet expansion disambiguity bit | Uplink spatial multiplexing | Doppler bit | Pilot format information |

Bit quantity: 1 | 1 | 6 | 2 | 1 | 16 | 1 | Variable length

FIG. 6(b) Common information field of the trigger frame

| Pilot sensing type | Pilot mode | Start time of an illumination frame | Quantity of illumination frames |
|---|---|---|---|

Bit quantity     4            1            16            8

FIG. 6(c) Format of the pilot format information in the trigger frame

FIG. 7(a) Frame format of a trigger frame

| Association identifier 12 bits | Resource block allocation | Uplink forward error correction coding type | Uplink modulation and coding method | Uplink dual subcarrier modulation bit | Spatial data stream allocation | Uplink target received signal strength | Reserved bit | Pilot format information |
|---|---|---|---|---|---|---|---|---|
| 12 | 8 | 1 | 4 | 1 | 6 | 7 | 1 | Variable length |

Bit quantity

FIG. 7(b) User information field of the trigger frame

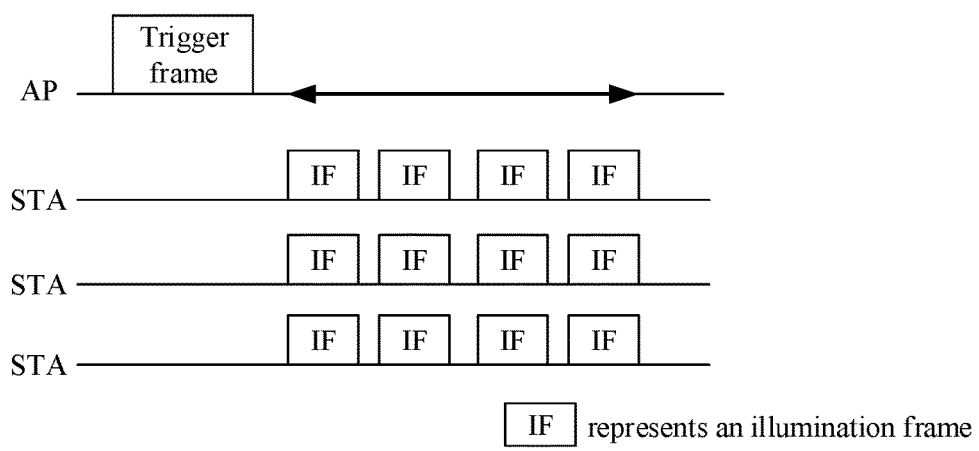
FIG. 7(c) Format of the pilot format information in the trigger frame
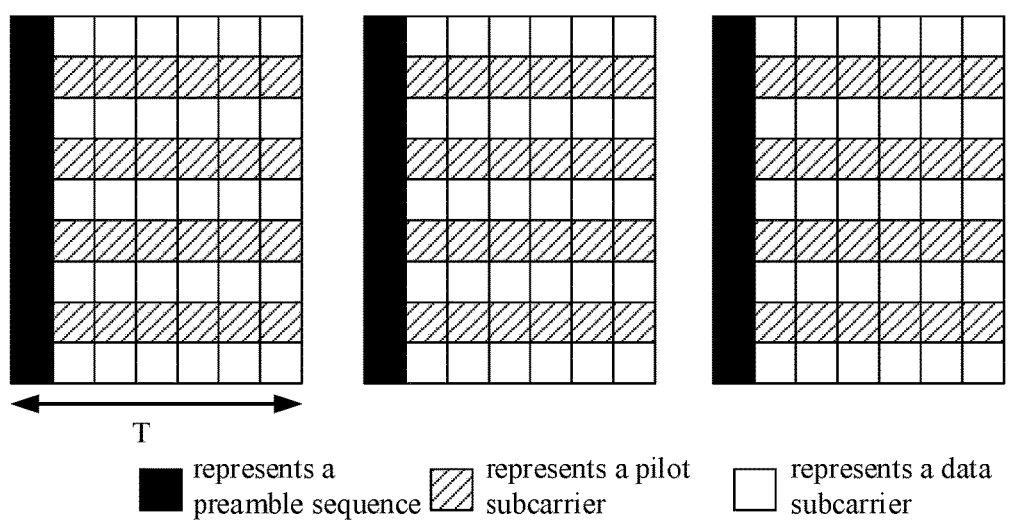
FIG. 8
FIG. 9a

| Frame control | Duration | Receive end address | Source address | Sounding dialog token | Pilot format information | Station information 1 | ... | Station information n | Frame check sequence |
|---|---|---|---|---|---|---|---|---|---|
| 2 | 2 | 6 | 6 | 1 | 4 | 4 | | 4 | 4 |

Byte quantity

FIG. 12(a) Frame format of an announcement frame

| Pilot mode | Quantity of illumination frames | Feedback type |
|---|---|---|
| 1 | 8 | 2 |

Bit quantity

FIG. 12(b) Format of the pilot format information in the announcement frame

METHOD FOR DETERMINING SENSING INFORMATION IN COMMUNICATION TRANSMISSION AND RELATED DEVICE

STATEMENT OF JOINT RESEARCH AGREEMENT

The subject matter and the claimed invention were made by or on the behalf of Hong Kong University of Science and Technology R and D Corporation Limited and Huawei Technologies Co., Ltd., of Shenzhen, Guangdong Province, P.R. China, under a joint research agreement titled "Research on intelligent sensing technology of wireless communication". The joint research agreement was in effect on or before the claimed invention was made, and that the claimed invention was made as a result of activities undertaken within the scope of the joint research agreement.

CROSS-REFERENCE TO RELATED APPLICATIONS

This application is a continuation of International Application No. PCT/CN2020/084785, filed on Apr. 14, 2020, which claims priority to Chinese Patent Application No. 201910741496.0, filed on Aug. 12, 2019. The disclosures of the aforementioned applications are hereby incorporated by reference in their entireties.

TECHNICAL FIELD

Embodiments of this application relate to the field of wireless communication technologies, and in particular, to a method for determining sensing information in communication transmission and a related device.

BACKGROUND

As a current mainstream wireless communication technology, a wireless fidelity (Wireless Fidelity, Wi-Fi) technology has been applied in various aspects of social production, commercial activities, and daily life. A large quantity of Wi-Fi nodes are widely distributed. In addition to common routers, notebook computers, and smartphones, an increasingly large quantity of Internet of Things devices are equipped with Wi-Fi chips. In addition, the IEEE (Institute of Electrical and Electronics Engineers, Institute of Electrical and Electronics Engineers) has constantly released communication standards such as high-efficiency wireless (High-Efficiency Wireless, HEW) standards 802.11ah and 802.11ax to satisfy new Internet of everything scenarios and requirements.

Widely distributed Wi-Fi devices not only greatly facilitate data information transmission, but also are suitable to be used as sensing infrastructure. During propagation, a radio signal reaches a receiver after being reflected by a surrounding object. The receiver obtains physical characteristics (for example, a signal transmission time and a signal frequency) of the radio signal through parsing to infer information such as a location, a velocity, and an orientation of the surrounding object, so as to sense the surrounding object. Integration of communication and sensing increases an added value of a Wi-Fi network, so that the Wi-Fi network not only can provide a communication service, but also can provide a service such as location awareness.

An existing radio signal-based sensing system obtains channel state information (Channel State Information, CSI) based on a preamble sequence in a radio signal, and infers information such as a location and a velocity of a surrounding object based on the CSI. During transmission of the radio signal, each aggregate media access control protocol data unit (Aggregate MAC protocol data unit, A-MPDU) includes only one preamble sequence. Therefore, this manner of obtaining the CSI based on the preamble sequence and inferring the information about the surrounding object based on the CSI is limited.

In a conventional technology, in a first solution for obtaining channel state information based on a radio signal, a design of a physical transmission data unit with midamble (midamble) sequences in the 802.11ax protocol, that is, a high-efficiency wireless (High-Efficiency Wireless, HEW) standard, is shown in FIG. 1. The midamble (midamble) sequence is a sequence that includes same content as a preamble (preamble) sequence but is at a location different from that of the preamble sequence. The midamble (midamble) sequences are arranged in the HE PPDU (High Efficiency multi-user physical protocol data unit, high efficiency physical transmission protocol data unit) at an interval of a preset quantity of subcarriers.

Because the midamble sequence has same content as the preamble sequence, the midamble sequence can also be used for radio signal sensing. Compared with a manner in which the preamble sequence is used for radio signal sensing, this manner in which the midamble sequence is used for radio signal sensing can improve performance of sensing the radio signal. However, an increase in a quantity of midamble sequences reduces wireless transmission efficiency.

In a second solution for obtaining channel state information based on a radio signal, a design of a transmission pilot in the communication protocol 802.11ah is shown in FIG. 2, where black boxes represent pilot subcarriers, white boxes represent data subcarriers, and a signal bandwidth is 2 MHz. In the 802.1ah protocol, a signal field, that is, a "transmission pilot" field (with a size of 1 bit), is used to indicate a pilot format used by a current physical protocol data unit (Physical protocol data unit, PPDU). When a transmission pilot indicator bit is 0, a fixed pilot is used; or when a transmit pilot indicator bit is 1, a transmission pilot is used.

The transmission pilot in the protocol in this implementation is mainly designed to reduce a Doppler effect caused by a mobile node and improve communication stability. The design of the transmission pilot is not used for obtaining channel state information or determining sensing information based on the channel state information.

In a third solution for obtaining channel state information based on a radio signal, a sending station first sends a null data packet announcement, and sends a null data packet after a preset time; and a receiving station receives the null data packet, obtains channel state information through measurement based on the received null data packet, and feeds the channel state information back to the sending station. A time length of a PPDU including the channel state information is related to a length of the channel state information and a currently used modulation and coding scheme (Modulation and Coding Scheme, MCS). In the transmission protocol, when the feedback information corresponding to the null data packet exceeds 11,454 bytes, the feedback information needs to be evenly divided into eight segments for transmission, but all segments still need to be included in one A-MPDU (or one PPDU).

In the communication transmission protocol, because all feedback frames corresponding to the null data packet need to be included in one PPDU, and locations of pilot subcarriers and a quantity of pilot subcarriers are all fixed, a manner of obtaining a channel state by using a feedback corresponding to the null data packet is limited. Therefore, performance of obtaining sensing information by a communication system is limited.

Therefore, an appropriate communication procedure and an appropriate format of a signal transmission frame need to be set to satisfy requirements of an electronic device for communication and sensing performance.

SUMMARY

Embodiments of this application provide a method for determining sensing information in communication transmission and a related device, to improve a capability of a wireless communication device in sensing information about a surrounding environment while ensuring transmission efficiency in wireless communication.

To achieve the foregoing technical objective, the following technical solutions are used in the embodiments of this application.

According to a first aspect, an embodiment of this application provides a method for determining sensing information in communication transmission. The method may be applied to a measurement station. The measurement station and a signal source station are connected through wireless communication. The method may include: The measurement station sends a trigger frame to the signal source station, where the trigger frame carries pilot format information, and the pilot format information is used to indicate a sending time point of a signal frame triggered by the trigger frame, a quantity of times for sending the signal frame, and a transmission mode of pilot information in the signal frame; the measurement station receives an illumination frame from the signal source station, where the illumination frame is the signal frame triggered by the trigger frame; and the measurement station analyzes channel state information in the illumination frame to obtain sensing information in the illumination frame, where the sensing information is used to indicate physical information of an object surrounding the signal source station and the measurement station.

In this embodiment of this application, the measurement station and the signal source station are connected through wireless communication, and the trigger frame sent by the measurement station carries the pilot format information, so that the measurement station can learn of a format of pilot information in the signal frame sent by the signal source station. In this way, the measurement station analyzes the channel state information in signal transmission based on the pilot information in the illumination frame received from the signal source station and known pilot information, so as to obtain the sensing information in the illumination frame. According to a manner of notifying a signal frame format in advance by using the trigger frame, a problem that communication efficiency is reduced when a data block is added in communication transmission is avoided, and a requirement of obtaining sensing information in a communication system is satisfied, thereby improving sensing performance of the wireless communication system.

With reference to the first aspect, in a possible implementation, that the measurement station analyzes the pilot information in the illumination frame to obtain the sensing information in wireless communication between the signal source station and the measurement station includes: If the measurement station successfully parses the illumination frame to obtain data, the measurement station reconstructs a data subcarrier in the illumination frame based on the data obtained after successful parsing, obtains channel state information of the data subcarrier, and analyzes the channel state information of the data subcarrier in the illumination frame and state information of a pilot subcarrier in the illumination frame, so as to obtain the sensing information.

If the illumination frame is successfully parsed by the measurement station, the illumination frame may be reconstructed, so that the measurement station can obtain all information in the illumination frame. Therefore, more sensing information that is more comprehensive is obtained based on the illumination frame, thereby further improving the sensing performance of the communication system.

With reference to the first aspect, in a possible implementation, that the measurement station analyzes the pilot information in the illumination frame to obtain the sensing information in wireless communication between the signal source station and the measurement station includes: If the measurement station fails to parse the illumination frame, the measurement station analyzes the pilot information in the pilot subcarrier in the illumination frame to obtain the sensing information.

If the illumination frame cannot be successfully parsed, the sensing information is obtained by using the pilot information in the pilot subcarrier in the illumination frame. This avoids a possibility that the data subcarrier is tampered with during communication transmission, thereby ensuring data transmission reliability of the communication system.

With reference to the first aspect, in a possible implementation, the physical information of the object includes at least one of a physical state of the object, a shape of the object, or a velocity of the object.

With reference to the first aspect, in a possible implementation, the transmission mode of the pilot information includes at least one of a fixed transmission mode and a stepped transmission mode; and a location of the pilot information on a subcarrier in the illumination frame is fixed in the fixed transmission mode, and a location of the pilot information on a subcarrier in the illumination frame changes according to a preset rule in the stepped transmission mode.

The transmission mode of the pilot information may be used to adjust sensing accuracy of the communication system, and different pilot transmission modes are set based on different channels. This helps improve sensing accuracy of sensing information in the wireless communication system while ensuring communication transmission, thereby improving the sensing performance of the wireless communication system.

According to a second aspect, an embodiment of this application provides a method for determining sensing information in communication transmission. The method may be applied to a signal source station, and the signal source station and a measurement station are connected through wireless communication. The method may include: The signal source station receives a trigger frame from the measurement station, where the trigger frame carries pilot format information, and the pilot format information is used to indicate a sending time point of a signal frame triggered by the trigger frame, a quantity of times for sending the signal frame, and a transmission mode of pilot information in the signal frame; and the signal source station generates an illumination frame based on the pilot format information, and sends the illumination frame to the measurement station, where the illumination frame carries sensing information, and the sensing information is used to indicate physical information of an object surrounding the signal source station and the measurement station.

It should be noted that, this embodiment may be implemented in combination with the embodiment in the first aspect. The measurement station applied in the embodiment in the first aspect and the signal source station applied in the method in this embodiment of this application cooperate with each other to implement information transmission, so as to obtain sensing information from a communication system. Related technical details mentioned in the embodiment in the first aspect are still effective in this embodiment. To reduce repetition, details are not described herein again. Correspondingly, related technical details mentioned in this embodiment may also be applied to the embodiment in the first aspect.

According to a third aspect, an embodiment of this application provides a method for determining sensing information in communication transmission. The method may be applied to a signal source station, and the signal source station and a measurement station are connected through wireless communication. The method may include: The signal source station sends an announcement frame to the measurement station, where the announcement frame carries pilot format information, and the pilot format information is used to indicate a sending time point of an illumination frame to be sent by the signal source station, a quantity of times for sending an illumination frame, and a transmission mode of pilot information in the illumination frame; and the signal source station generates the illumination frame based on the pilot format information, and sends the illumination frame to the measurement station, where the illumination frame received by the measurement station carries sensing information, and the sensing information is used to indicate physical information of an object surrounding the signal source station and the measurement station.

In this embodiment of this application, after broadcasting an announcement, the signal source station sends the illumination frame to the measurement station. Because a pilot format in the illumination frame has been described in the announcement, after receiving the illumination frame from the signal source station, the measurement station compares the pilot format information in the announcement and pilot format information in the illumination frame, and analyzes pilot information in the illumination frame to obtain the sensing information. In this way, the sensing information can be obtained during wireless communication while communication transmission is satisfied, thereby improving sensing performance of the wireless communication system.

With reference to the third aspect, in a possible implementation, the method further includes: The signal source station sends a trigger frame or a polling frame to the measurement station, where the trigger frame or the polling frame is used to indicate the measurement station to feed back the sensing information to the signal source station; and the signal source station receives the sensing information from the measurement station.

In this implementation, the signal source station receives the sensing information from the measurement station, so that the signal source station can directly obtain the sensing information.

With reference to the third aspect, in a possible implementation, the transmission mode of the pilot information includes at least one of a fixed transmission mode and a stepped transmission mode; and a location of the pilot information on a subcarrier in the illumination frame is fixed in the fixed transmission mode, and a location of the pilot information on a subcarrier in the illumination frame changes according to a preset rule in the stepped transmission mode.

According to a fourth aspect, an embodiment of this application provides a method for determining sensing information in communication transmission. The method may be applied to a measurement station. The measurement station and a signal source station are connected through wireless communication. The method may include: The measurement station receives an announcement frame from the signal source station, where the announcement frame carries pilot format information, and the pilot format information is used to indicate a sending time point of an illumination frame to be sent by the signal source station, a quantity of times for sending an illumination frame, and a transmission mode of pilot information in the illumination frame; the measurement station receives the illumination frame from the signal source station based on the pilot format information; and the measurement station analyzes channel state information in the illumination frame to obtain sensing information in the illumination frame, where the sensing information is used to indicate physical information of an object surrounding the signal source station and the measurement station.

In this embodiment of this application, the announcement frame carries the pilot format information, so that the measurement station first receives the announcement frame, and compares the pilot format information in the announcement frame and pilot information in the subsequently received illumination frame to obtain the sensing information in wireless communication between the signal source station and the measurement station. In this way, the sensing information in the wireless communication process can be obtained while a requirement of communication between the signal source station and the measurement station is satisfied, thereby improving sensing performance of wireless communication.

With reference to the fourth aspect, in a possible implementation, the method further includes: The measurement station receives a trigger frame or a polling frame from the signal source station, where the trigger frame or the polling frame is used to indicate the measurement station to feed back the sensing information to the signal source station; and the measurement station successively sends sensing information corresponding to all illumination frames to the signal source station in an order of receiving an illumination frame for a plurality of times.

According to a fifth aspect, an embodiment of this application further provides a method for determining sensing information in communication transmission. The method may be applied to a measurement station. The measurement station and a signal source station are connected through wireless communication. The method may include: The measurement station receives a data packet sent by the signal source station; and the measurement station analyzes physical layer information in the data packet to obtain sensing information in wireless communication between the signal source station and the measurement station.

According to a sixth aspect, an embodiment of this application provides a measurement station. The measurement station may be connected to a signal source station through wireless communication. The measurement station may include a memory and at least one processor, and the memory is coupled to the processor. The memory is configured to store computer program code, where the computer program code includes computer instructions. When the processor executes the computer instructions, the processor is configured to send a trigger frame to a signal source station, where the trigger frame carries pilot format information, and the pilot format information is used to indicate a sending time point of a signal frame triggered by the trigger frame, a quantity of times for sending the signal frame, and a transmission mode of pilot information in the signal frame. The processor is further configured to receive an illumination frame from the signal source station, where the illumination frame is the signal frame triggered by the trigger frame. The processor is further configured to analyze channel state information in the illumination frame to obtain sensing information in the illumination frame, where the sensing information is used to indicate physical information of an object surrounding the signal source station and the measurement station.

With reference to the sixth aspect, in a possible implementation, the processor is specifically configured to: if it is determined that the illumination frame is successfully parsed to obtain data, reconstruct a data subcarrier in the illumination frame based on the data obtained after successful parsing, obtain channel state information of the data subcarrier, and analyze the channel state information of the data subcarrier in the illumination frame and state information of a pilot subcarrier in the illumination frame, so as to obtain the sensing information.

With reference to the sixth aspect, in a possible implementation, the processor is specifically configured to: if it is determined that the illumination frame is not successfully parsed, analyze pilot information in the pilot subcarrier in the illumination frame to obtain the sensing information.

With reference to the sixth aspect, in a possible implementation, the physical information of the object includes at least one of a physical state of the object, a shape of the object, or a velocity of the object.

With reference to the sixth aspect, in a possible implementation, the transmission mode of the pilot information includes at least one of a fixed transmission mode and a stepped transmission mode; and a location of the pilot information on a subcarrier in the illumination frame is fixed in the fixed transmission mode, and a location of the pilot information on a subcarrier in the illumination frame changes according to a preset rule in the stepped transmission mode.

According to a seventh aspect, an embodiment of this application provides a signal source station. The signal source station and a measurement station are connected through wireless communication. The signal source station may include a memory and at least one processor, and the memory is coupled to the processor. The memory is configured to store computer program code, where the computer program code includes computer instructions. When the processor executes the computer instructions, the processor is configured to receive a trigger frame from the measurement station, where the trigger frame carries pilot format information, and the pilot format information is used to indicate a sending time point of a signal frame triggered by the trigger frame, a quantity of times for sending the signal frame, and a transmission mode of pilot information in the signal frame. The processor is further configured to: generate an illumination frame based on the pilot format information, and send the illumination frame to the measurement station, where the illumination frame carries sensing information, and the sensing information is used to indicate physical information of an object surrounding the signal source station and the measurement station.

It should be noted that, the signal source station in this embodiment may be used in combination with the measurement station in the sixth aspect, and the signal source station and the measurement station are connected to each other through wireless communication, and cooperate with each other to implement information transmission, so as to obtain sensing information from a communication system. Therefore, related technical details mentioned in the embodiment in the sixth aspect are still effective in this embodiment. To reduce repetition, details are not described herein again. Correspondingly, related technical details mentioned in this embodiment may also be applied to the embodiment in the sixth aspect.

According to an eighth aspect, an embodiment of this application provides a signal source station. The signal source station and a measurement station are connected through wireless communication. The signal source station may include a memory and at least one processor, and the memory is coupled to the processor. The memory is configured to store computer program code, where the computer program code includes computer instructions. When the processor executes the computer instructions, the processor is configured to send an announcement frame to a measurement station, where the announcement frame carries pilot format information, and the pilot format information is used to indicate a sending time point of an illumination frame to be sent by the signal source station, a quantity of times for sending an illumination frame, and a transmission mode of pilot information in the illumination frame. The processor is further configured to: generate the illumination frame based on the pilot format information, and send the illumination frame to the measurement station, where the illumination frame received by the measurement station carries sensing information, and the sensing information is used to indicate physical information of an object surrounding the signal source station and the measurement station.

With reference to the eighth aspect, in a possible implementation, the processor is further configured to send a trigger frame or a polling frame to the measurement station, where the trigger frame or the polling frame is used to indicate the measurement station to feed back the sensing information to the signal source station. The processor is further configured to receive the sensing information from the measurement station.

According to a ninth aspect, an embodiment of this application provides a measurement station. The measurement station and a signal source station are connected through wireless communication. The measurement station may include a memory and at least one processor, and the memory is coupled to the processor. The memory is configured to store computer program code, where the computer program code includes computer instructions. When the processor executes the computer instructions, the processor is configured to receive an announcement frame from the signal source station, where the announcement frame carries pilot format information, and the pilot format information is used to indicate a sending time point of an illumination frame to be sent by the signal source station, a quantity of times for sending an illumination frame, and a transmission mode of pilot information in the illumination frame. The processor is further configured to receive the illumination frame from the signal source station based on the pilot format information. The processor is further configured to analyze channel state information in the illumination frame to obtain sensing information in the illumination frame, where the sensing information is used to indicate physical information of an object surrounding the signal source station and the measurement station.

It should be noted that, the measurement station in this embodiment may be used in combination with the signal source station in the eighth aspect, and the signal source station and the measurement station are connected to each other through wireless communication, and cooperate with each other to implement information transmission, so as to obtain sensing information from a communication system. Therefore, related technical details mentioned in the embodiment in the eighth aspect are still effective in this embodiment. To reduce repetition, details are not described herein again. Correspondingly, related technical details mentioned in this embodiment may also be applied to the embodiment in the eighth aspect.

According to a tenth aspect, an embodiment of this application further provides a measurement station. The measurement station and a signal source station are connected through wireless communication. The measurement station may include a memory and at least one processor, and the memory is coupled to the processor. The memory is configured to store computer program code, where the computer program code includes computer instructions. When the processor executes the computer instructions, the processor is configured to receive a data packet sent by the signal source station. The processor is further configured to analyze physical layer information in the data packet to obtain sensing information in wireless communication between the signal source station and the measurement station.

According to an eleventh aspect, an embodiment of this application provides a computer storage medium. The computer storage medium includes computer instructions. When the computer instructions are run on a wireless communication device, the wireless communication device is enabled to perform the method according to any one of the first aspect, the second aspect, the third aspect, the fourth aspect, the fifth aspect, or the possible design manners thereof.

According to a twelfth aspect, an embodiment of this application provides a computer program product. When the computer program product runs on a computer, the computer is enabled to perform the method according to any one of the first aspect, the second aspect, the third aspect, the fourth aspect, the fifth aspect, or the possible design manners thereof.

It can be understood that, for beneficial effects that can be achieved by the station provided in any one of the sixth aspect, the seventh aspect, the eighth aspect, the ninth aspect, the tenth aspect, or the possible design manners thereof, the computer storage medium in the eleventh aspect, and the computer program product in the twelfth aspect, reference may be made to the beneficial effects in any one of the first aspect, the second aspect, or the possible design manners thereof. Details are not described herein again.

BRIEF DESCRIPTION OF DRAWINGS

FIG. 8 is a sequence diagram of a wireless communication transmission process according to an embodiment of this application;

FIG. 9a is a schematic diagram of a structure of an illumination frame in which a pilot mode is a first fixed mode according to an embodiment of this application;

FIG. 12(a) and FIG. 12(b) are a schematic diagram of a data structure of an announcement frame according to an embodiment of this application;

DESCRIPTION OF EMBODIMENTS

Figure 1:
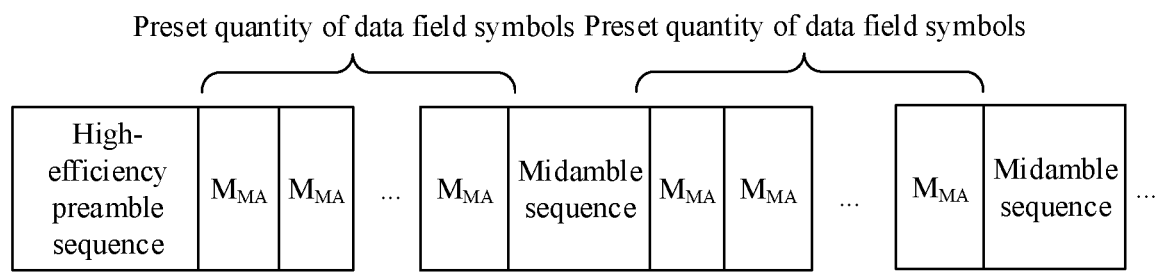
FIG. 1 is a schematic diagram of a design format of a physical transmission unit in existing wireless communication in the background of this application.
Figure 2:
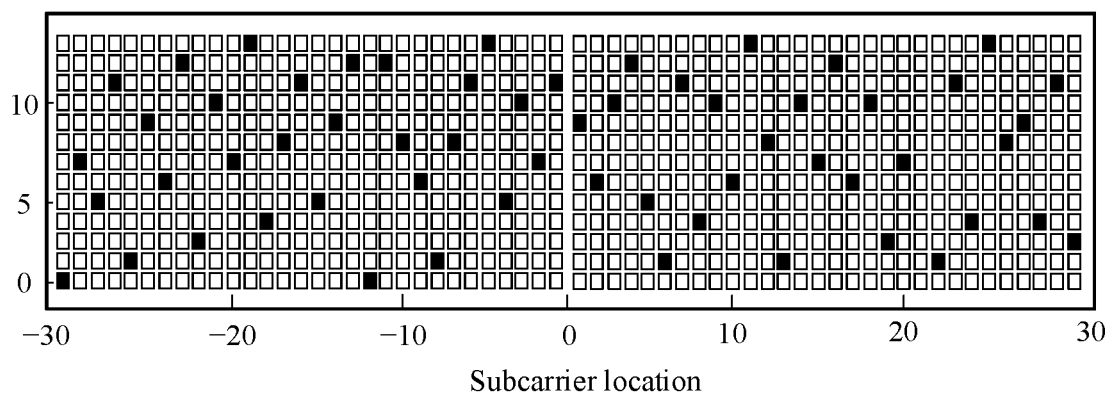
FIG. 2 is a schematic diagram of a design format of a transmission pilot in a communication protocol in the background of this application.

The following terms "first" and "second" are merely intended for a purpose of description, and cannot be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

The following explains communication terms that may be used in this application:

Orthogonal frequency division multiplexing (Orthogonal frequency division multiplexing, OFDM): Orthogonal frequency division multiplexing is a multi-carrier transmission technology, and specifically includes: dividing a channel into several orthogonal subchannels, converting a high-speed data signal into parallel low-speed data substreams, and modulating the parallel low-speed data substreams to different subchannels for transmission. Therefore, this technology can implement high-rate transmission and can effectively resist frequency selective fading.

Pilot subcarrier/data subcarrier: In a Wi-Fi protocol, each OFDM symbol except a preamble sequence usually includes a pilot subcarrier and a data subcarrier. In an OFDM symbol, a pilot subcarrier is a subcarrier on which a preset sequence is placed, and a data subcarrier is a subcarrier on which transmission data is placed. In a communication system, a pilot subcarrier is usually used to help detect and correct a phase shift of a subcarrier, thereby improving accuracy of parsing a data subcarrier.

Bistatic mode: There are usually two stations in the bistatic mode. From a communication perspective, in a time period, one station sends a data packet, and the other station receives and parses the data packet. From a sensing perspective, one station (that is, a signal source station) sends a radio signal; the radio signal reaches the other station (that is, a measurement station) through a direct line of sight path and a non-line-of-sight path caused by reflection of a surrounding object; and the other station receives and parses the radio signal.

Null data packet (Null Data Packet, NDP) sounding: Null data packet sounding is a manner used to obtain channel state information or beamforming information. A null data packet includes only a preamble sequence and does not include data. A sounding process includes: One station sends a null data packet; and another station receives the null data packet, detects the null data packet, obtains channel state information/beamforming information through calculation, and then feeds back the channel state information/beamforming information to the station that sends the null data packet.

Transmit opportunity (Transmit Opportunity, TXOP): A transmit opportunity means that after a station successfully contends for a channel, the station may use the channel for data packet transmission in a period of time.

The embodiments of this application provide a method for determining sensing information in communication transmission. The method may be applied to a signal source station and a measurement station that are connected through wireless communication (for example, connected in a Wi-Fi mode), to measure sensing information in wireless communication between the signal source station and the measurement station. By implementing the method provided in the embodiments of this application, the sensing information in a communication environment of the signal source station and the measurement station can be obtained while wireless communication between the signal source station and the measurement station is ensured, that is, a requirement of communication between the signal source station and the measurement station is satisfied, and the sensing information in the communication environment is obtained. This improves a capability of sensing a surrounding environment by the signal source station or the measurement station.

It should be noted that, the signal source station and the measurement station are connected through wireless communication, the signal source station is configured to send a radio signal, and the measurement station is configured to receive the radio signal. The method provided in the embodiments of this application is applied to short-range wireless communication transmission. Therefore, a distance between the signal source station and the measurement station is within a preset distance. For example, the preset distance between the signal source station and the measurement station is 10 meters, 50 meters, or 30 meters.

A theoretical basis of the method for determining sensing information in communication transmission provided in the embodiments of this application is as follows: In a short-range wireless communication process, a radio signal transmitted by a transmitter usually does not reach a receiver along a straight path, and a radio signal received by the receiver is formed after the radio signal transmitted by the transmitter is reflected, diffracted, and scattered by an indoor device. The radio signal received by the receiver is a superposition of a plurality of signals formed after the radio signal transmitted by the transmitter is reflected, diffracted, and scattered by indoor furniture, a human body, and other obstacles. This phenomenon is referred to as a multipath effect. Specifically, in the short-range wireless communication process, an object in physical space affects transmission of the radio signal, and all objects in an environment (for example, furniture and walls) can "modulate" the radio signal. In this case, the radio signal becomes a periodic or time-varying signal. Sensing information in a wireless communication environment can be obtained by analyzing such signal.

In a specific implementation, sensing information in wireless communication is obtained by analyzing a pilot subcarrier in a radio signal. A method for extracting a pilot subcarrier from an OFDM symbol is used as an example. There are N subcarriers in an OFDM system, and a payload in each OFDM symbol includes a pilot subcarrier and a data subcarrier. A baseband signal in time domain in a payload in an $i^{th}$ OFDM symbol is represented by Formula 1:

$$s^{(i)}(kT) = \Sigma_{n \in D_i} \; S_{i,n} \; e^{\frac{j2\pi nk}{N}} + \Sigma_{n \in P_i} \; S_{i,n} \; e^{\frac{j2\pi nk}{N}} \qquad \text{Formula 1}$$

where $s^{(i)}(kT)$ represents the signal in time domain in the payload in the $i^{th}$ OFDM symbol, $\Sigma_{n \in D_i}$ $$S_{i,n} \; e^{\frac{j2\pi nk}{N}}$$

represents a data subcarrier in time domain in the payload of the $i^{th}$ OFDM symbol, and $\Sigma_{n \in P_i}$ $$S_{i,n} \; e^{\frac{j2\pi nk}{N}}$$

represents a pilot subcarrier in time domain in the payload of the $i^{th}$ OFDM symbol, $D_i$ represents a set of data subcarriers, $P_i$ represents a set of pilot subcarriers, T represents a cycle, and K represents a constant.

It can be learned from Formula 1 that, the pilot subcarrier and the data subcarrier are superposed with each other in time domain. If the signal is to be demodulated, Fourier transform is performed on the payload of the OFDM symbol in time domain to extract the pilot subcarrier. According to such transform mode, the pilot subcarrier at a known location can be extracted. Formula 2 is obtained after Fourier transform is performed on the payload of the OFDM symbol in Formula 1, and indicates that an $i^{th}$ subcarrier in the pilot subcarriers is extracted:

$$s^{(l,p)}(kT) = \Sigma_{n \in P_i} \; S_{I,n} \; e^{\frac{j2\pi nk}{N}} \qquad \text{Formula 2}$$

where $s^{(l,p)}(kT)$ represents the $i^{th}$ pilot subcarrier in the payload of the OFDM symbol, $P_i$ represents the set of pilot subcarriers, T represents the cycle, and K is the constant.

For example, the signal source station and the measurement station in the embodiments of this application each may be a device that can perform wireless communication, for example, a router, a gateway device, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the signal source station or the measurement station is not particularly limited in this application.

Figure 3:
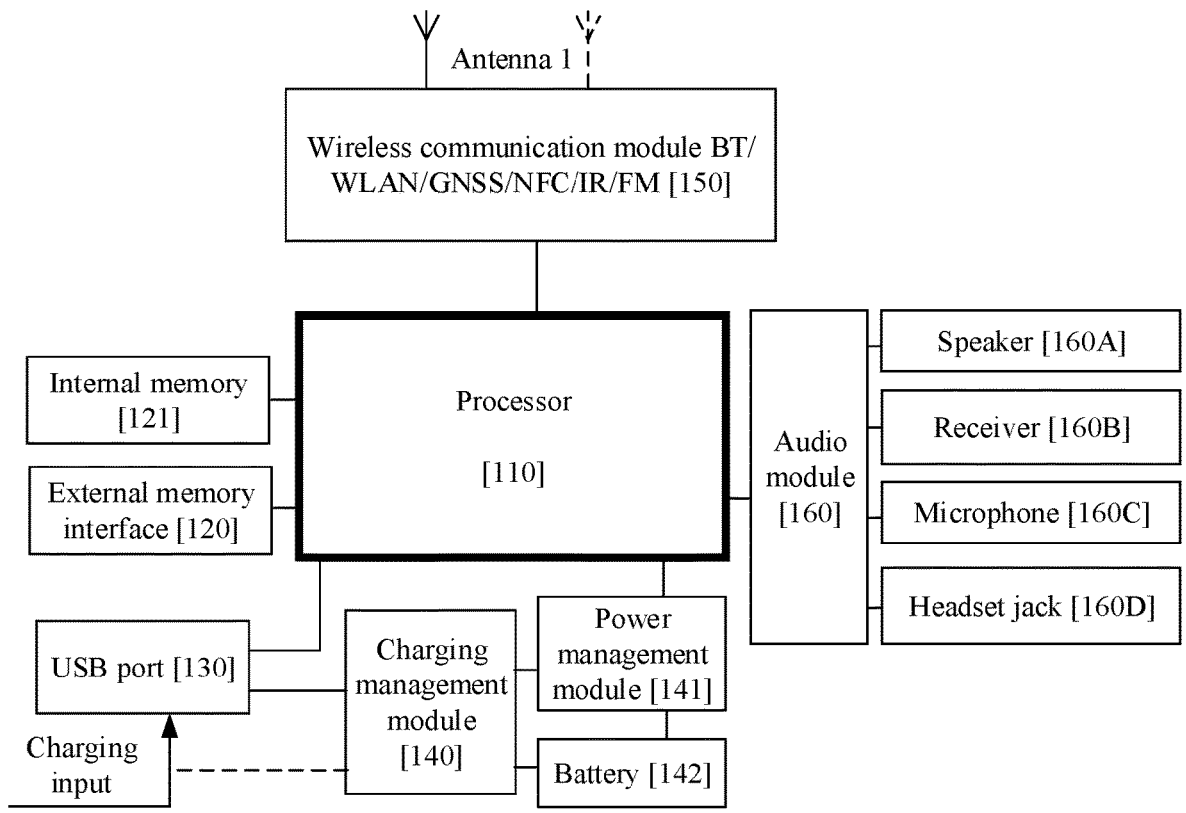
FIG. 3 is a schematic diagram of a hardware structure of a wireless communication device according to an embodiment of this application.

The following describes the implementation of this embodiment of this application in detail with reference to an accompanying drawing. FIG. 3 shows a structure of a wireless communication device according to an embodiment of this application. As shown in FIG. 3, the wireless communication device may include a processor 110, an external memory interface 120, an internal memory 121, a universal serial bus (universal serial bus, USB) port 130, a charging management module 140, a power management module 141, a battery 142, an antenna 1, a wireless communication module 150, an audio module 160, a speaker 160A, a receiver 160B, a microphone 160C, a headset jack 160D, and the like.

It can be understood that, the structure of the wireless communication device in this embodiment may be a signal source station, or may be a measurement station. No limitation is imposed on the signal source station or the measurement station. In some other embodiments, the wireless communication device may alternatively include more or fewer components than those shown in the figure, a combination of some components, splitting of some components, or a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the wireless communication device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access and reduces waiting time of the processor 110, improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that, interface connection relationships between the modules that are described in this embodiment of this application are merely examples for description, and do not constitute any limitation on the structure of the wireless communication device. In some other embodiments, the wireless communication device may alternatively use interface connection manners different from those in this embodiment or use a combination of a plurality of interface connection manners.

The charging management module 140 is configured to receive a charging input from a charger. The charger may be a wireless charger or a wired charger. In some wired charging embodiments, the charging management module 140 may receive a charging input from a wired charger through a USB port 130. In some wireless charging embodiments, the charging management module 140 may receive a wireless charging input through a wireless charging coil of the wireless communication device. The charging management module 140 may supply power to the wireless communication device through the power management module 141 in addition to charging the battery 142.

The power management module 141 is configured to connect to the battery 142, the charging management module 140, and the processor 110. The power management module 141 receives an input from the battery 142 and/or an input from the charging management module 140, to supply power to the processor 110, the internal memory 121, an external memory, the wireless communication module 150, and the like. The power management module 141 may be further configured to monitor parameters such as a battery capacity, a battery cycle count, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the wireless communication device may be implemented by using the antenna 1, the wireless communication module 150, the modem processor, the baseband processor, and the like.

The antenna 1 is configured to transmit and receive electromagnetic wave signals. The antenna in the wireless communication device may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers a processed signal to the application processor. The application processor outputs a sound signal by using an audio device (which is not limited to the speaker 160A and the receiver 160B). In some embodiments, the modem processor may be an independent device.

The wireless communication module 150 may provide wireless communication solutions applied to the wireless communication device, for example, wireless local area network (wireless local area network, WLAN) (such as wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), and infrared (infrared, IR) technologies.

The wireless communication module 150 may be one or more components that integrate at least one communication processing module. The wireless communication module 150 receives an electromagnetic wave through the antenna 1, performs frequency modulation and filtering processing on the electromagnetic wave signal, and sends a processed signal to the processor 110. The wireless communication module 150 may further receive a to-be-sent signal from the processor 110, perform frequency modulation and amplification on the signal, and convert the signal into an electromagnetic wave for radiation through the antenna 1.

The external memory interface 120 may be configured to connect to an external memory card, for example, a micro SD card, to expand a storage capability of the wireless communication device. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 performs various function applications and data processing of the wireless communication device by running the instructions stored in the internal memory 121. For example, in this embodiment of this application, the processor 110 may execute the instructions stored in the internal memory 121. The internal memory 121 may include a program storage area and a data storage area.

The program storage area may store an operating system, an application required by at least one function (for example, a sound playing function or an image playing function), and the like. The data storage area may store data (such as audio data and a phone book) created during use of the wireless communication device, and the like. In addition, the internal memory 121 may include a high-speed random access memory, or may include a nonvolatile memory, for example, at least one magnetic disk storage device, a flash memory, or a universal flash storage (universal flash storage, UFS).

The wireless communication device may implement an audio function, such as music playing and recording, by using the audio module 160, the speaker 160A, the receiver 160B, the microphone 160C, the headset jack 160D, the application processor, and the like.

The audio module 160 is configured to convert digital audio information into an analog audio signal output, and is also configured to convert an analog audio input into a digital audio signal. The audio module 160 may be further configured to encode and decode an audio signal. In some embodiments, the audio module 160 may be disposed in the processor 110, or some functional modules in the audio module 160 are disposed in the processor 110. The speaker 160A, also referred to as a "loudspeaker", is configured to convert an audio electrical signal into a sound signal. The receiver 160B, also referred to as an "earpiece", is configured to convert an audio electrical signal into a sound signal. The microphone 160C, also referred to as a "mike" or a "mic", is configured to convert a sound signal into an electrical signal.

The headset jack 160D is configured to connect to a wired headset. The headset jack 160D may be a USB port 130, or may be a 3.5 mm open mobile terminal platform (open mobile terminal platform, OMTP) standard interface or a Cellular Telecommunications Industry Association of the USA (cellular telecommunications industry association of the USA, CTIA) standard interface.

All methods in the following embodiments can be implemented in the wireless communication device having the foregoing hardware structure.

It should be noted that, in the embodiments of this application, the signal source station and the measurement station each are a device that can perform wireless communication, and the signal source station and the measurement station each may be the wireless communication device in the foregoing embodiment. For example, in a Wi-Fi system, the signal source station may be an access point (Access Point, AP), and the measurement station is a station (Station, STA); or the signal source station may be a station (Station, STA), and the measurement station is an access point (Access Point, AP).

In the following first method embodiment, an example in which a signal source station is a STA and a measurement station is an AP is used to describe the method in the embodiments of this application.

Figure 4:
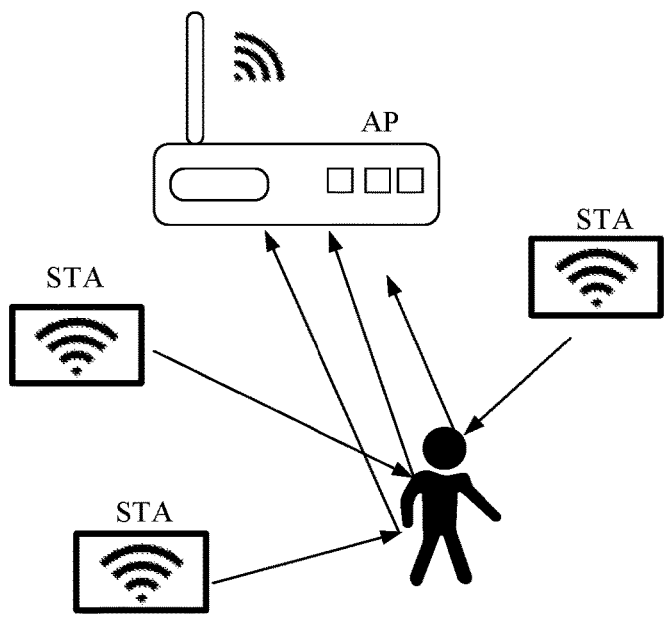
FIG. 4 is a scenario diagram of wireless communication transmission according to an embodiment of this application.

For example, the AP is a router, and the STA is a mobile phone. As shown in FIG. 4, in an application scenario, the router serves as an AP to perform wireless communication with the mobile phone. The router sends a trigger frame to the mobile phone; the mobile phone sends an illumination frame to the router in response to the trigger frame from the router; and the router obtains sensing information based on the illumination frame received from the mobile phone.

Figure 5:
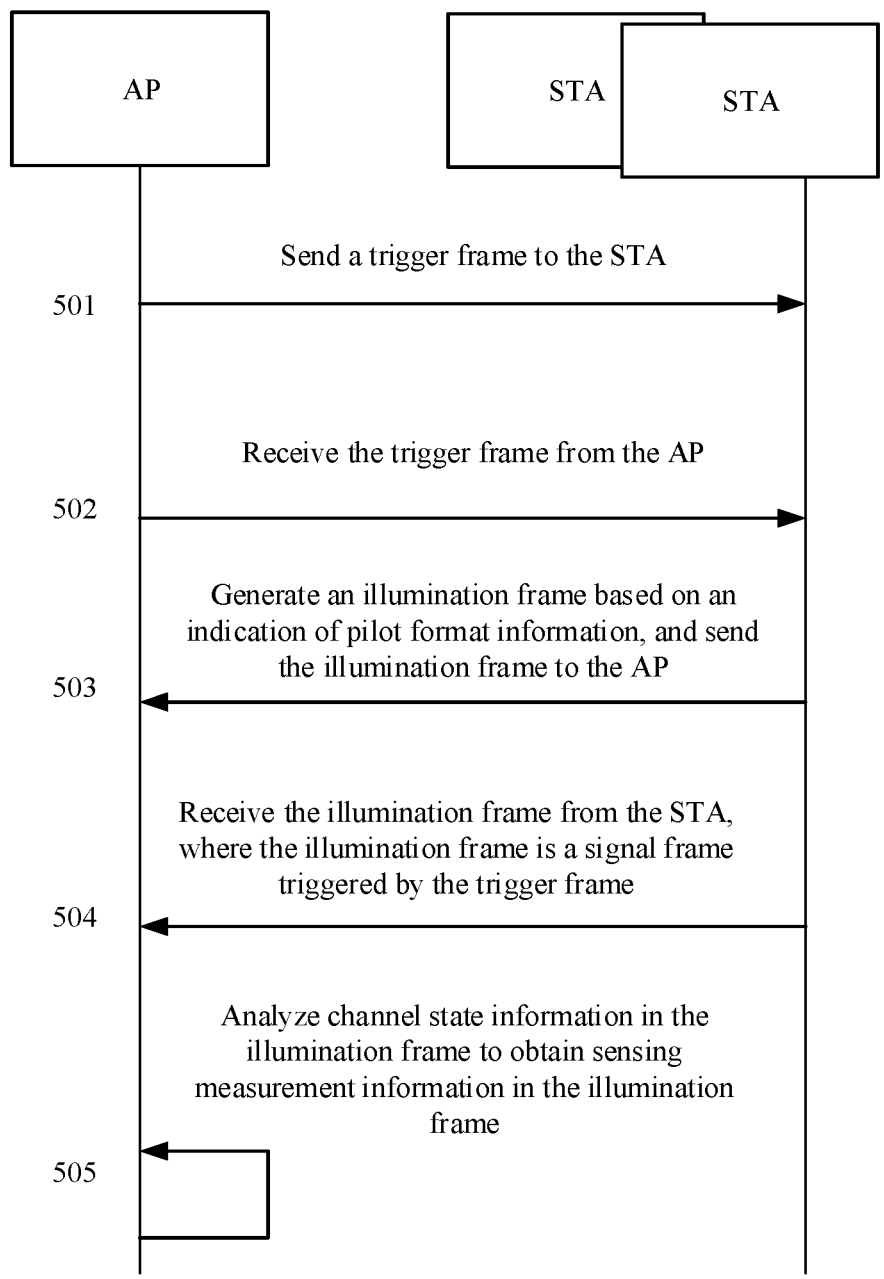
FIG. 5 is a flowchart of a method for determining sensing information in communication transmission according to an embodiment of this application.

An embodiment of this application provides a method for determining sensing information in communication transmission. The method is applied to a wireless communication process between an AP and a STA. The AP and the STA are connected through wireless communication. An interaction procedure in the method is shown in FIG. 5, and includes step 501 to step 505.

Step 501: The AP sends a trigger frame to the STA.

The trigger frame carries pilot format information, and the pilot format information is used to indicate a sending time point of a signal frame triggered by the trigger frame, a quantity of times for sending the signal frame, and a transmission mode of pilot information in the signal frame.

It should be noted that, an implementation principle of this application is as follows: In a wireless communication transmission process, a radio signal reaches a receiver after being reflected, diffracted, and scattered by an object in a surrounding environment; and the receiver analyzes the received signal to obtain channel state information, and obtains sensing information in a wireless communication environment based on the channel state information. Therefore, the AP may obtain a channel transmit opportunity TXOP before sending the trigger frame.

Optionally, before sending the trigger frame, the AP performs channel contention and obtains a channel transmit opportunity. In this way, in a wireless communication transmission process between the STA and the AP, wireless communication information is transmitted on the channel to determine channel state information of the channel, so as to obtain sensing information. Therefore, a specific implementation in which the AP sends the trigger frame to the STA includes: The AP sends the trigger frame to the STA on the channel.

Figure 6:
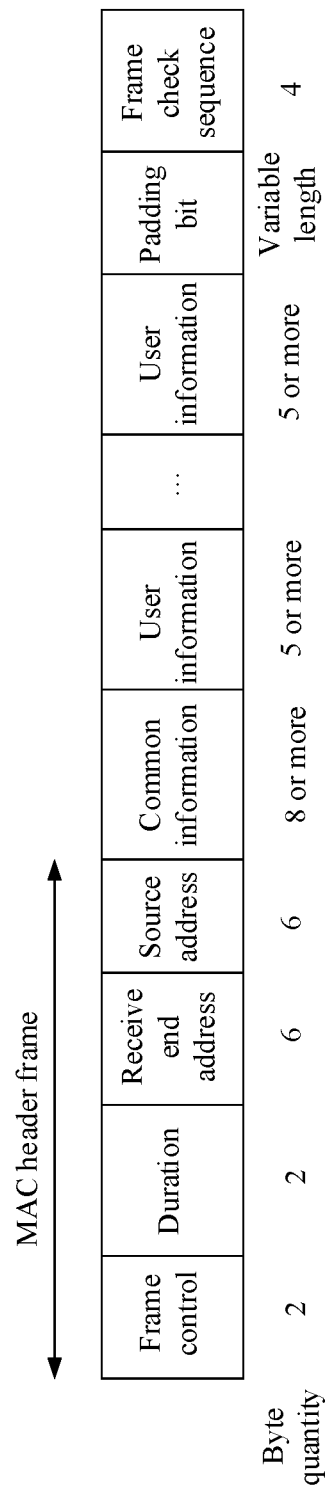
FIG. 6(a), FIG. 6(b), and FIG. 6(c) are a schematic diagram of a data frame format of a trigger frame according to an embodiment of this application.

In a specific implementation, the trigger frame carries the pilot format information, and a frame format of the trigger frame is shown in FIG. 6(a), FIG. 6(b), and FIG. 6(c). FIG. 6(a) shows the frame format, FIG. 6(b) shows a data format of a common information field in the trigger frame, and FIG. 6(c) shows a format of the pilot format information in the trigger frame.

Figure 7:
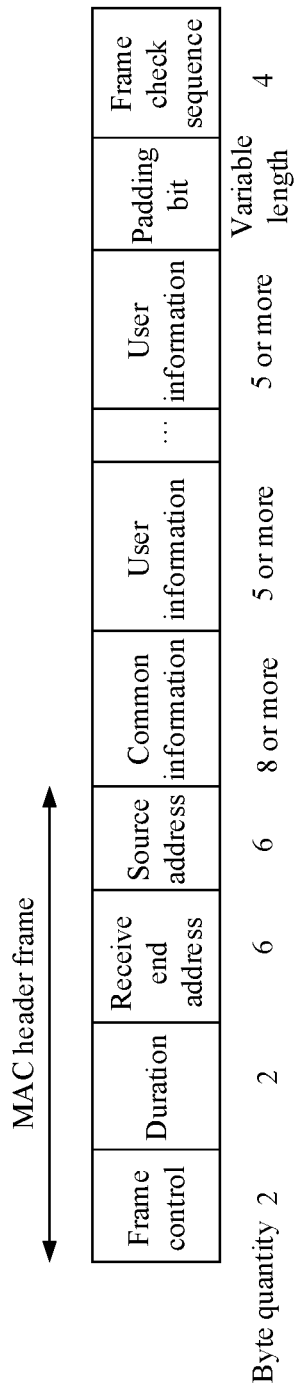
FIG. 7(a), FIG. 7(b), and FIG. 7(c) are a schematic diagram of a data frame format of another trigger frame according to an embodiment of this application.

In another specific implementation, the pilot format information in the trigger frame may alternatively be set in user information in a trigger frame format. FIG. 7(a) shows a frame format, FIG. 7(b) shows a data format of a user information field in the trigger frame, and FIG. 7(c) shows a format of the pilot format information in the trigger frame.

It should be noted that the foregoing specific implementations are merely examples for description. In actual application, the pilot format information may alternatively be set in another field. This is not specifically limited.

Step 502: The STA receives the trigger frame from the AP.

The trigger frame carries the pilot format information, and the pilot format information is used to indicate the sending time point of the signal frame triggered by the trigger frame, the quantity of times for sending the signal frame, and the transmission mode of the pilot information in the signal frame.

Step 503: The STA generates an illumination frame based on an indication of the pilot format information, and sends the illumination frame to the AP.

The illumination frame carries pilot information used to determine sensing information in wireless communication between the STA and the AP.

In actual application, the method in this embodiment needs to be implemented through cooperation between the AP and the STA. The method for determining sensing information in communication transmission is implemented through wireless communication interaction between the STA and the AP. The AP sends the trigger frame to the STA. The STA receives the trigger frame from the AP. The STA sends, to the AP, the illumination frame carrying the pilot information. The AP does not need to add a data block in wireless communication. This ensures transmission efficiency of the AP.

Step 504: The AP receives the illumination frame from the STA, where the illumination frame is the signal frame triggered by the trigger frame.

The illumination frame may be a data frame carrying data, or may be a null data packet and includes only the pilot information.

Optionally, a quantity of illumination frames is related to the pilot format information in the trigger frame, and the pilot format information includes the quantity of illumination frames. The application scenario shown in FIG. 4 is used as an example. If each STA sends four illumination frames to the AP, a corresponding sequence diagram is shown in FIG. 8.

Step 505: The AP analyzes channel state information in the illumination frame to obtain sensing information in the illumination frame.

The sensing information is used to indicate physical information of an object surrounding the AP and the STA.

Optionally, the physical information of the object includes at least one of a physical state, a shape of the object, and a velocity of the object. For example, the sensing information obtained by the AP is that a square object is placed at a location five meters away from the AP.

Optionally, analyzing the illumination frame by the AP may be parsing the illumination frame and obtaining the sensing information based on a parsing result. In a specific implementation, if the AP successfully parses the illumination frame to obtain data, the AP reconstructs a data subcarrier in the illumination frame based on the data obtained after successful parsing, obtains channel state information of the data subcarrier, and analyzes the channel state information of the data subcarrier and channel state information of a pilot subcarrier to obtain the sensing information. In another specific implementation, if the AP fails to parse the illumination frame, the AP analyzes the channel state information of the pilot subcarrier in the illumination frame to obtain the sensing information.

It should be understood that, if the illumination frame can be successfully parsed, the AP may obtain pilot information in the pilot subcarrier in the illumination frame and pilot information in the data subcarrier in the illumination frame, so that sensing performance of a communication system is improved. In a specific implementation, the AP and the STA may agree on a manner of decoding the illumination frame, so that the AP can successfully parse the illumination frame, to improve the sensing performance of the wireless communication system.

Optionally, if the AP transmits the trigger frame on the channel after obtaining a channel transmit opportunity, the AP may analyze the illumination frame in the following manner: The AP analyzes channel state information, and determines sensing information corresponding to the channel state information.

Optionally, the transmission mode of the pilot information in the illumination frame includes at least one of a fixed transmission mode and a stepped transmission mode; and a location of the pilot information on a subcarrier in the illumination frame is fixed in the fixed transmission mode, and a location of the pilot information on a subcarrier in the illumination frame changes according to a preset rule in the stepped transmission mode.

Figure 9B:
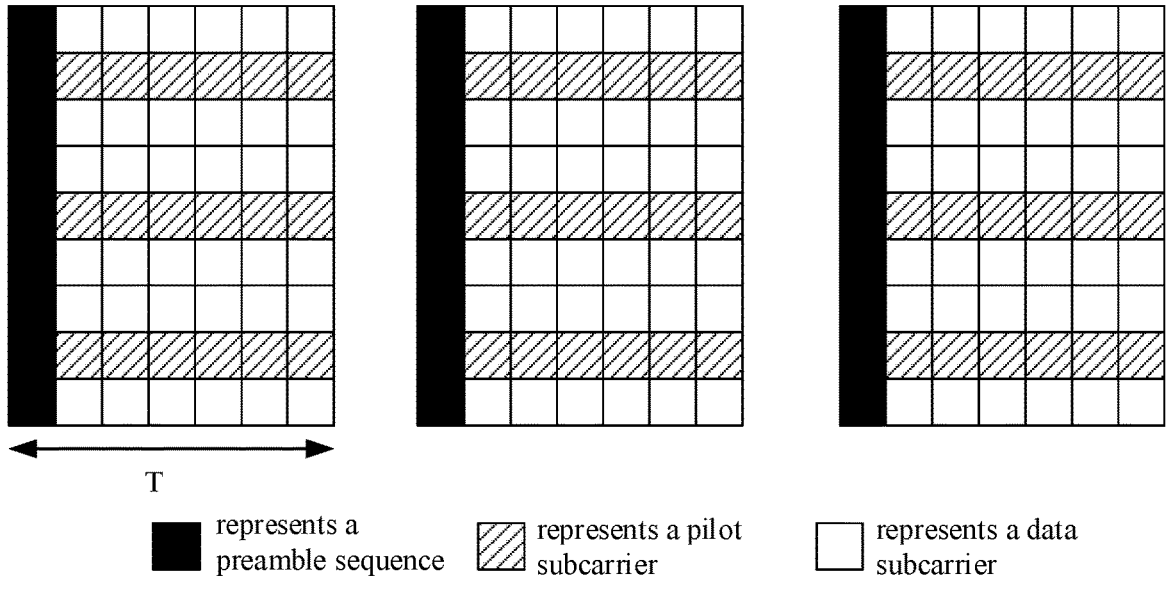
FIG. 9b is a schematic diagram of a structure of an illumination frame in which a pilot mode is a second fixed mode according to an embodiment of this application.
Figure 9C:
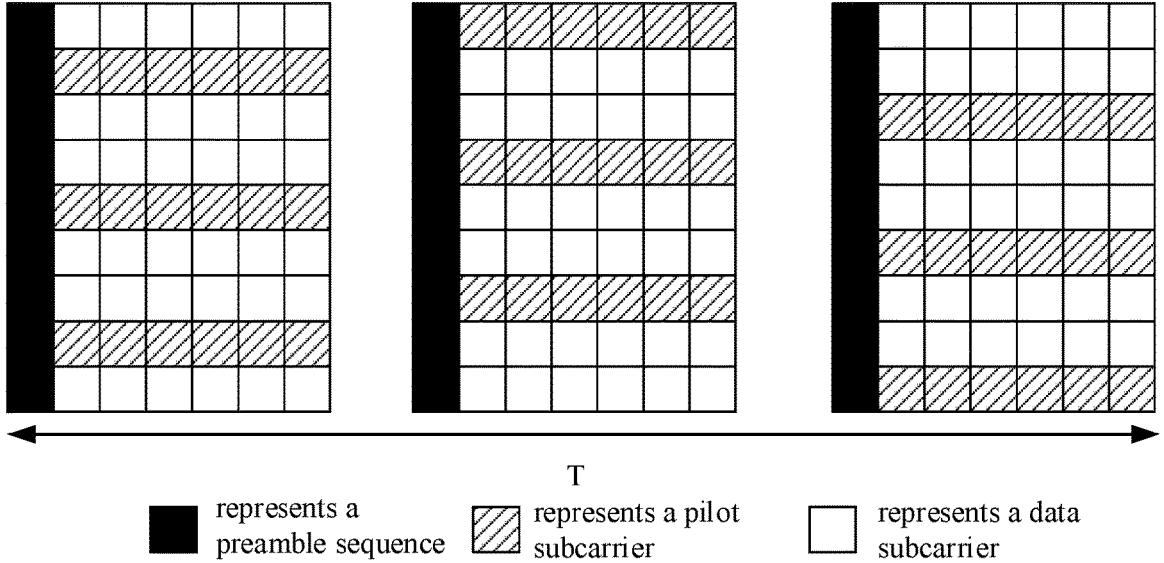
FIG. 9c is a schematic diagram of a structure of an illumination frame in which a pilot mode is a stepped transmission mode according to an embodiment of this application.

Specifically, in a process of setting a pilot mode in the illumination frame, a pilot indicator bit needs to be set in the illumination frame. For example, a pilot indicator bit is added to a signal field (SIGNAL field, SIG) at a physical layer (Physical layer, PHY), a length of the pilot indicator bit may be 1 bit (bit), and the pilot indicator bit is used to indicate a pilot mode used. For example, FIG. 9a shows a first fixed mode, FIG. 9b shows a second fixed mode, and FIG. 9c shows a stepped transmission mode. Locations of pilots, locations of preamble sequences, and locations of data that are in the illumination frame are marked in the figures.

Quantities of pilots in FIG. 9a and FIG. 9b are different, so that maximum unambiguous ranges in FIG. 9a and FIG. 9b are different. A maximum unambiguous range represents accuracy of sensing an illumination frame. The maximum unambiguous range in FIG. 9a is greater than the maximum unambiguous range in FIG. 9b. Therefore, sensing accuracy of sensing information obtained based on an illumination frame in FIG. 9a is higher. However, because locations of data in FIG. 9a are fewer, efficiency of transmitting the data in FIG. 9a is lower than that of transmitting the data in FIG. 9b. One cycle in the stepped transmission mode is longer than that in the fixed mode, and a quantity of pilots and a quantity of pieces of data in the stepped transmission mode are greater than those in the fixed mode. As shown in FIG. 9c, locations of pilots in all illumination frames are not fixed, a quantity of pilots is greater than that of pilots in the fixed modes, and efficiency of transmitting data is not reduced. In actual wireless communication transmission, an appropriate pilot mode may be set based on to-be-transmitted data. For example, if there is a quite small amount of to-be-transmitted data, and all the to-be-transmitted data can be carried in the first fixed mode in FIG. 9a, the first fixed mode is selected. If there is a relatively large amount of to-be-transmitted data, and required sensing accuracy is relatively high, the stepped transmission mode shown in FIG. 9c may be selected for transmission.

Accuracy of sensing an illumination frame is different in different pilot modes. In actual application, sensing requirements of different devices are also different. Specifically, an appropriate pilot mode may be set according to a sensing requirement of a device, so as to satisfy sensing accuracy of the device. This is not specifically limited herein.

It can be understood that, the AP and the STA are connected through wireless communication, and the trigger frame sent by the AP carries the pilot format information, so that the AP can learn of a format of the pilot information in the signal frame sent by the STA. In this way, the AP learns, through analysis, a change characteristic of the pilot information in signal transmission based on the pilot information in the illumination frame received from the STA and known pilot information, so as to obtain the sensing information in wireless communication between the STA and the AP. According to a manner of notifying a signal frame format in advance by using the trigger frame, a data block does not need to be added in wireless communication transmission, thereby ensuring transmission efficiency in wireless communication transmission, satisfying a requirement of obtaining sensing information in a communication system, and improving sensing performance of the wireless communication system.

In addition, in a specific implementation, more than one STA and more than one AP may be included in a wireless communication environment. The STA or the AP can perform wireless communication. A wireless communication interaction process between the STA and the AP is shown in FIG. 5. For example, the AP is a router, and the STA is a mobile phone. In a wireless communication environment, the mobile phone may be communicatively connected to a plurality of routers. Because the mobile phone performs wireless communication only with a router currently connected to the mobile phone through wireless communication, the mobile phone can be connected to another router through wireless communication by switching the router connected to the mobile phone.

In a second method embodiment of this application, an example in which a signal source station is an AP and a measurement station is a STA is used to describe the method in the embodiments of this application.

Figure 10:
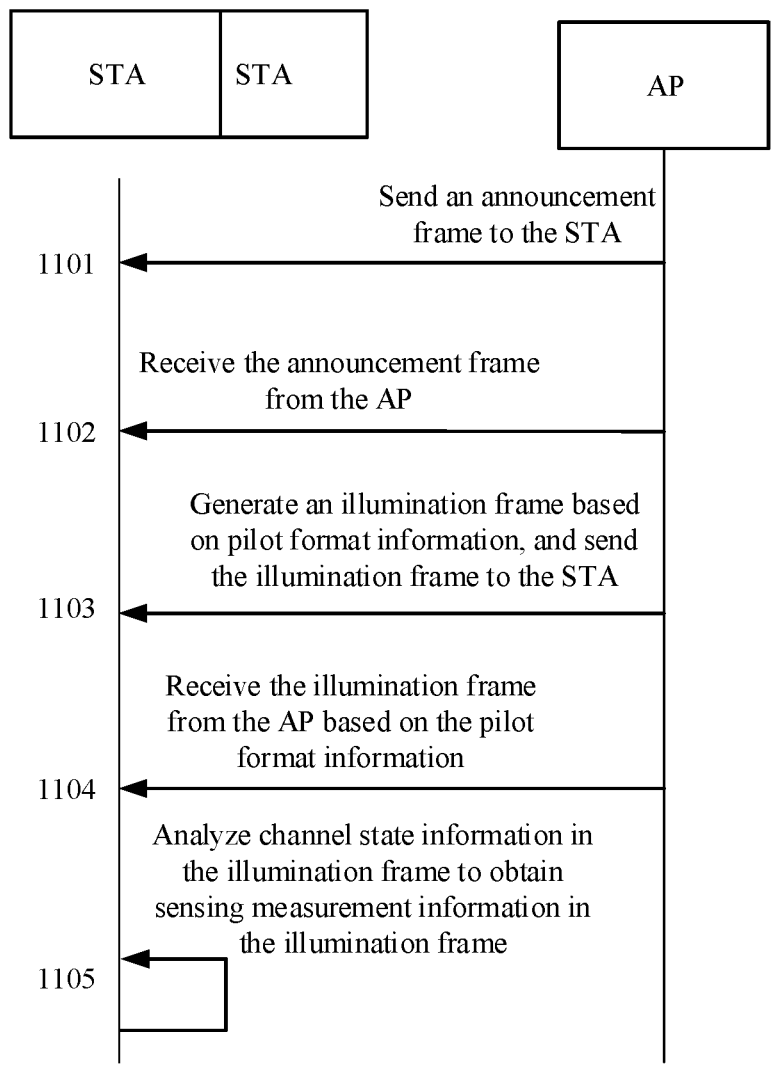
FIG. 10 shows another method for determining sensing information in communication transmission according to an embodiment of this application.

An embodiment of this application provides a method for determining sensing information in communication transmission. The method is applied to a wireless communication process between an AP and a STA. The STA and the AP are connected through wireless communication. An implementation procedure in the method is shown in FIG. 10, and includes step 1101 to step 1105.

Figure 11:
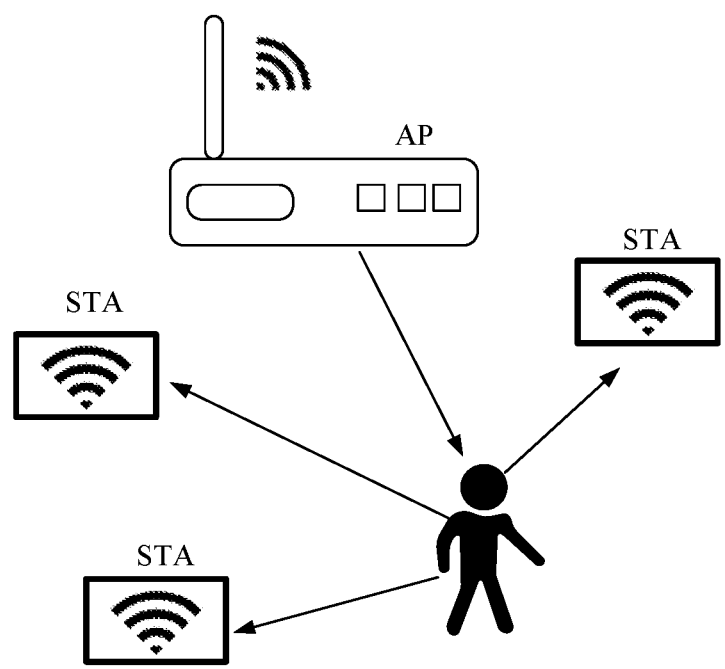
FIG. 11 is a scenario diagram of wireless communication transmission according to an embodiment of this application.

It should be noted that, in actual application, more than one AP may be included in a wireless communication environment. For example, the AP is a mobile phone, and the STA is a router. In a wireless communication environment, the router can serve as a STA to receive trigger frames sent by a plurality of APs, receive an illumination frame sent by each AP, and send feedback information to the AP in response to each trigger frame. FIG. 11 shows a scenario structure diagram.

Step 1101: The AP sends an announcement frame to the STA.

The announcement frame carries pilot format information, and the pilot format information is used to indicate a sending time point of an illumination frame to be sent by the AP, a quantity of times for sending an illumination frame, and a transmission mode of pilot information in the illumination frame.

Optionally, before sending the announcement frame to the STA, the AP performs channel contention and obtains a channel transmit opportunity. In this way, in a wireless transmission process between the AP and the STA, a wireless communication signal is transmitted on the channel to obtain channel state information of the channel, so as to obtain sensing information in wireless communication based on the channel state information. In this case, a specific implementation of broadcasting the announcement frame by the AP is broadcasting the announcement frame on the channel.

In a specific implementation, the announcement frame carries the pilot format information, and an implementation of setting the pilot format information in the announcement frame is shown in FIG. 12(*a*) and FIG. 12(*b*). FIG. 12(*a*) shows a frame format of the announcement frame, and FIG. 12(*b*) shows a data format of the pilot format information.

It should be noted that, the format of the announcement frame is merely an example. In actual application, the pilot format information may alternatively be set at another location based on a frame structure of the announcement frame. This is not specifically limited herein.

Step 1102: The STA receives the announcement frame from the AP.

The announcement frame carries the pilot format information, and the pilot format information is used to indicate the sending time point of the illumination frame to be sent by the AP, the quantity of times for sending an illumination frame, and the transmission mode of the pilot information in the illumination frame.

Step 1103: The AP generates the illumination frame based on the pilot format information, and sends the illumination frame to the STA.

The illumination frame carries pilot information used to determine sensing information in wireless communication between the AP and the STA.

Optionally, the transmission mode of the pilot information includes at least one of a fixed transmission mode and a stepped transmission mode; and a location of the pilot information on a subcarrier in the illumination frame is fixed in the fixed transmission mode, and a location of the pilot information on a subcarrier in the illumination frame changes according to a preset rule in the stepped transmission mode.

It should be noted that, both the illumination frame in this embodiment and the illumination frame in the first method embodiment are generated by the AP and sent to the STA. The detailed description about the structure of the illumination frame in the first method embodiment may be directly applied to the illumination frame in this embodiment. To reduce repetition, details are not described herein again. Correspondingly, the description about a structure of the illumination frame in this embodiment may also be applied to the structure of the illumination frame in the first implementation.

Step 1104: The STA receives the illumination frame from the AP based on the pilot format information.

Step 1105: The STA analyzes channel state information in the illumination frame to obtain sensing information in the illumination frame.

The sensing information is used to indicate physical information of an object surrounding the AP and the STA.

Optionally, the STA receives a trigger frame or a polling frame from the AP. The trigger frame or the polling frame is used to indicate the STA to feed back the sensing information to the AP. The STA successively sends sensing information corresponding to all illumination frames to the AP in an order of receiving an illumination frame for a plurality of times.

In a specific implementation, the STA receives the trigger frame from the AP, and feeds back the sensing information based on an indication of the trigger frame. The trigger frame sent by the AP carries information indicating to perform feedback, and information to be fed back is the sensing information obtained by the STA. For example, the STA obtains the sensing information based on wireless communication. The sensing information includes information such as a velocity of an object, a location of the object, and a distance between the object and a signal source. In addition, the information indicating to perform feedback may indicate the STA to feed back all the sensing information, or may indicate the STA to feed back a part of the sensing information.

It should be noted that, in a process in which the STA analyzes information about the illumination frame, there are a case in which the STA successfully parses the information about the illumination frame and a case in which the STA fails to parse the illumination frame. In addition, the STA not only may receive the illumination frame from the AP, but also may receive a data packet transmitted by another communication device. Therefore, in a process in which the STA sends the sensing information to the AP, the STA further needs to feed back original data on which the sensing information is based. For example, a feedback indicator bit is added. If the STA successfully parses the illumination frame, the feedback indicator bit is 0, indicating that original data on which the sensing information that is fed back is based is the illumination frame. If the STA fails to parse the illumination frame, the feedback indicator bit is 1, indicating that original data on which the sensing information that is fed back is based is a data packet.

Specifically, in the wireless communication process between the STA and the AP, the STA may receive more than one illumination frame. If sensing information obtained based on each illumination frame obtained by the STA needs to be fed back to the AP, the STA carries a dialog flag when feeding back the sensing data. The dialog flag is used to indicate a trigger frame corresponding to the feedback information.

In actual application, the method in this embodiment needs to be implemented through cooperation between the STA and the AP. As shown in FIG. 10, in a wireless communication interaction process between the STA and the AP, the method for determining sensing information in communication transmission is implemented through wireless communication interaction between the AP and the STA.

Figure 13:
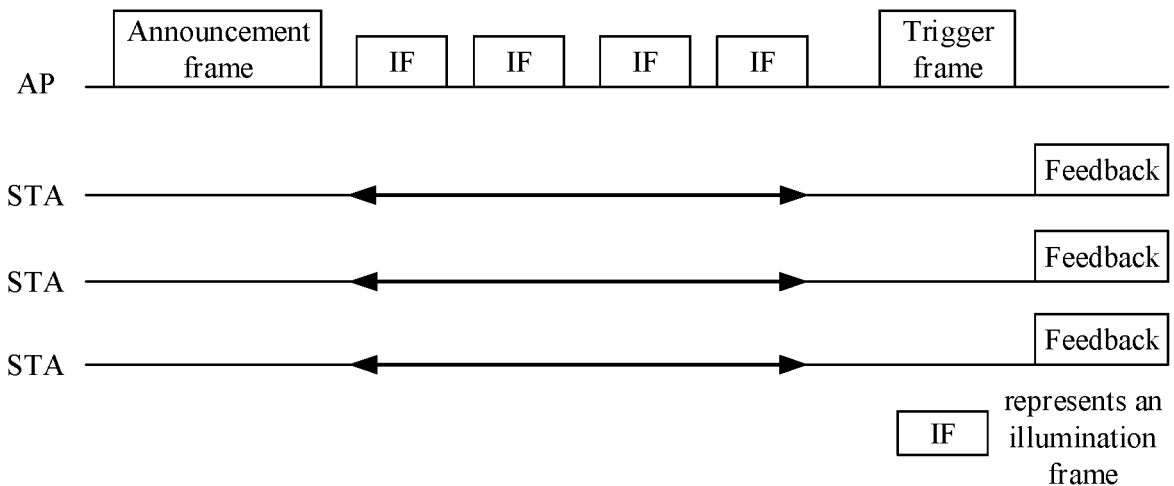
FIG. 13 is a sequence diagram of a wireless communication transmission process according to an embodiment of this application.

It can be understood that, more than one AP and more than one STA may be included in a wireless communication environment in which the method in this application is applied, and the AP or the STA can perform wireless communication. A scenario shown in FIG. 12(*a*) and FIG. 12(*b*) is used as an example. A sequence diagram of wireless communication between the AP and the STA is shown in FIG. 13. In the sequence diagram, a feedback phase is included. An example in which the AP sends a trigger frame to obtain feedback information is used.

A third method embodiment of this application provides a method for determining sensing information in communication transmission. The method may be applied to a measurement station, and an implementation procedure of the method includes: The measurement station receives a data packet sent by a signal source station. The measurement station analyzes physical layer information in the data packet to obtain sensing information in wireless communication between the signal source station and the measurement station.

Specifically, the measurement station in this embodiment is a measurement station in a communication environment, and may not be connected to the signal source station through wireless communication. However, the measurement station may obtain, through listening, the data packet sent by the signal source station, and the measurement station may also obtain, through listening, a data packet sent by another measurement station. In actual application, the measurement station may be an AP or a STA in a Wi-Fi system.

Optionally, the measurement station in this embodiment may listen to a data packet sent by each wireless communication device in the first method embodiment or the second method embodiment.

A specific implementation is as follows: An example in which the measurement station in this embodiment is a listening STA is used, and a wireless communication device in an environment includes an AP in a Wi-Fi system. Before performing communication or sensing, the AP sends a beacon to the listening STA. The beacon carries communication information, and the communication information includes an identity of a signal source station (the signal source station is an AP or a STA), a start time for sending an illumination frame, a quantity of times for sending an illumination frame, and a pilot mode in the illumination frame. In this way, the listening STA may obtain sensing information in wireless communication based on an obtained data packet.

Figure 14A:
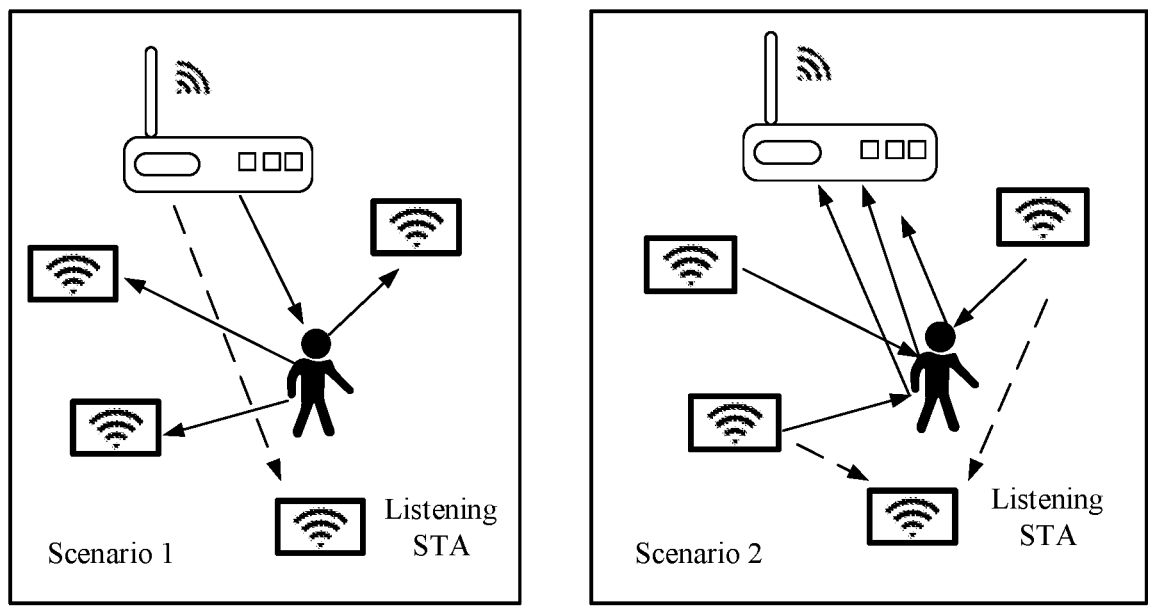
FIG. 14a is a scenario diagram of wireless communication transmission according to an embodiment of this application.
Figure 14B:
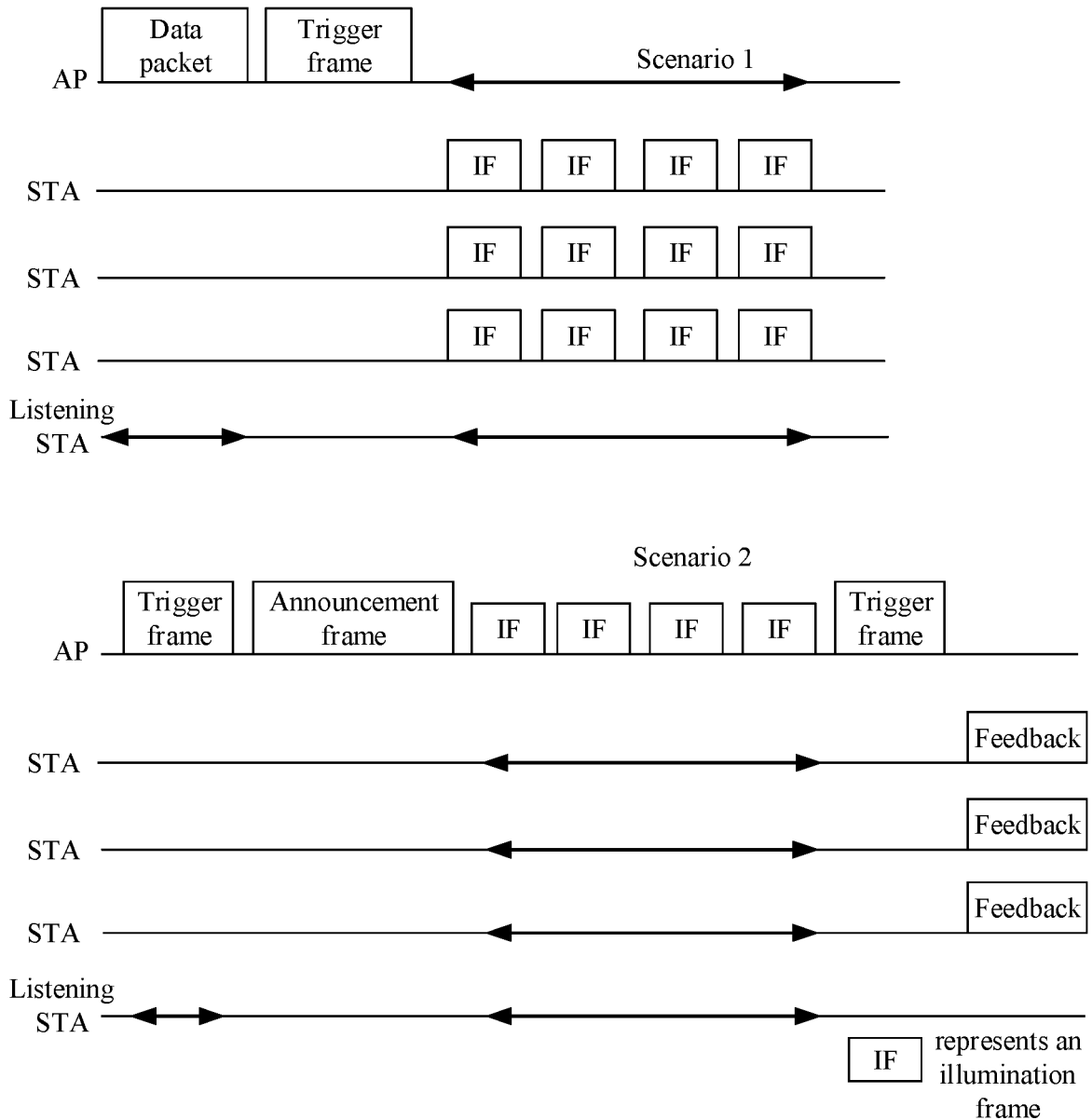
FIG. 14b is a sequence diagram of a wireless communication transmission process according to an embodiment of this application.

A scenario diagram of this specific implementation is shown in FIG. 14*a*, and a listening STA may exist in both the scenario in the first method embodiment or the scenario in the second method embodiment. A sequence diagram of the listening STA in this scenario is shown in FIG. 14*b*.

It should be noted that, in a communication transmission process, sensing information can be obtained by a listening measurement station. To be specific, a measurement station in a non-wireless communication environment can also interact with a device in a wireless communication environment to obtain sensing information. In this way, sensing efficiency of a wireless communication system is improved, and a sensing range of the wireless communication system is expanded.

Some other embodiments of this application provide a measurement station. The measurement station may include a memory and one or more processors. The memory is coupled to the processor. The memory is configured to store computer program code, where the computer program code includes computer instructions. When the processor executes the computer instructions, the measurement station can perform functions or method steps applied to the measurement station in the foregoing method embodiments. For a structure of the measurement station, refer to the structure of the wireless communication device shown in FIG. 3.

Some other embodiments of this application provide a signal source station. The signal source station may include a memory and one or more processors. The memory is coupled to the processor. The memory is configured to store computer program code, where the computer program code includes computer instructions. When the processor executes the computer instructions, the signal source station can perform functions or method steps applied to the signal source station in the foregoing method embodiments. For a structure of the signal source station, refer to the structure of the wireless communication device shown in FIG. 3.

An embodiment of this application further provides a computer storage medium. The computer storage medium includes computer instructions. When the computer instructions are run on a wireless communication device, the wireless communication device is enabled to perform functions or steps performed by the mobile phone in the foregoing method embodiments.

An embodiment of this application further provides a computer program product. When the computer program product runs on a computer, the computer is enabled to perform functions or steps performed by the mobile phone in the foregoing method embodiments.

The foregoing descriptions about implementations allow a person skilled in the art to understand that, for the purpose of convenient and brief description, division into the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the embodiments provided in this application, it should be understood that the disclosed apparatus and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected depending on actual requirements to achieve the objectives of the solutions in the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

If the integrated unit is implemented in a form of a software functional unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for determining sensing information in a communication transmission, applied to a measurement station, wherein the measurement station and a signal source station are coupled through wireless communication, wherein the method comprises:
    sending, by the measurement station, a trigger frame to the signal source station, wherein the trigger frame carries pilot format information, and the pilot format information is used to indicates a sending time point of a signal frame triggered by the trigger frame, a quantity of times for sending the signal frame, and a transmission mode of pilot information in the signal frame;
    receiving, by the measurement station, an illumination frame from the signal source station, wherein the illumination frame is the signal frame triggered by the trigger frame; and
    analyzing, by the measurement station, channel state information in the illumination frame to obtain sensing information in the illumination frame, wherein the sensing information indicates physical information of an object surrounding the signal source station and the measurement station,
    wherein analyzing the channel state information in the illumination frame to obtain sensing information in the illumination frame comprises:
        in response to the measurement station successfully parsing the illumination frame to obtain data:
            reconstructing a data subcarrier in the illumination frame based on the data,
            obtaining channel state information of the data subcarrier,
            analyzing the channel state information of the data subcarrier in the illumination frame and channel state information of a pilot subcarrier in the illumination frame, and
            obtaining the sensing information.

2. The method according to claim 1, wherein the physical information of the object comprises at least one of a physical state of the object, a shape of the object, or a velocity of the object.

3. The method according to claim 1, wherein the transmission mode of the pilot information comprises at least one of a fixed transmission mode or a stepped transmission mode; and
    a location of the pilot information on a subcarrier in the illumination frame is fixed in the fixed transmission mode, and a location of the pilot information on a subcarrier in the illumination frame changes according to a preset rule in the stepped transmission mode.

4. A method for determining sensing information in a communication transmission, applied to a measurement station, wherein the measurement station and a signal source station are coupled through wireless communication, wherein the method comprises:

sending, by the measurement station, a trigger frame to the signal source station, wherein the trigger frame carries pilot format information, and the pilot format information is used to indicates a sending time point of a signal frame triggered by the trigger frame, a quantity of times for sending the signal frame, and a transmission mode of pilot information in the signal frame;

receiving, by the measurement station, an illumination frame from the signal source station, wherein the illumination frame is the signal frame triggered by the trigger frame; and analyzing, by the measurement station, channel state information in the illumination frame to obtain sensing information in the illumination frame, wherein the sensing information indicates physical information of an object surrounding the signal source station and the measurement station, wherein analyzing the channel state information in the illumination frame to obtain sensing information in the illumination frame comprises:
in response to the measurement station failing to parse the illumination frame, analyzing the channel state information of a pilot subcarrier in the illumination frame to obtain the sensing information.

5. The method according to claim 4, wherein the physical information of the object comprises at least one of a physical state of the object, a shape of the object, or a velocity of the object.

6. The method according to claim 4, wherein the transmission mode of the pilot information comprises at least one of a fixed transmission mode or a stepped transmission mode; and
a location of the pilot information on a subcarrier in the illumination frame is fixed in the fixed transmission mode, and a location of the pilot information on a subcarrier in the illumination frame changes according to a preset rule in the stepped transmission mode.

7. A measurement station comprising:
at least one processor;
a memory coupled to the at least one processor, wherein the memory includes tangible, non-transitory, machine-readable media storing one or more instructions that, when executed by the at least one processor, cause the measurement station to perform operations comprising:
sending a trigger frame to a signal source station, wherein the trigger frame carries pilot format information, and the pilot format information indicates a sending time point of a signal frame triggered by the trigger frame, a quantity of times for sending the signal frame, and a transmission mode of pilot information in the signal frame;

receiving an illumination frame from the signal source station, wherein the illumination frame is the signal frame triggered by the trigger frame; and analyzing channel state information in the illumination frame to obtain sensing information in the illumination frame, wherein the sensing information indicates physical information of an object surrounding the signal source station and the measurement station, wherein the measurement station is configured such that, in response to the measurement station successfully parsing the illumination frame to obtain data, the operations include:
reconstructing a data subcarrier in the illumination frame based on the data,
obtaining channel state information of the data subcarrier,
analyzing the channel state information of the data subcarrier in the illumination frame and channel state information of a pilot subcarrier in the illumination frame, and
obtaining the sensing information.

8. The measurement station according to claim 7, wherein the measurement station is configured such that, in response to the measurement station failing to parse the illumination frame, the operations include analyzing the channel state information of a pilot subcarrier in the illumination frame to obtain the sensing information.

9. The measurement station according to claim 8, wherein the physical information of the object comprises at least one of a physical state of the object, a shape of the object, or a velocity of the object.

10. The measurement station according to claim 8, wherein the transmission mode of the pilot information comprises at least one of a fixed transmission mode or a stepped transmission mode; and
a location of the pilot information on a subcarrier in the illumination frame is fixed in the fixed transmission mode, and a location of the pilot information on a subcarrier in the illumination frame changes according to a preset rule in the stepped transmission mode.

11. The measurement station according to claim 7, wherein the physical information of the object comprises at least one of a physical state of the object, a shape of the object, or a velocity of the object.

12. The measurement station according to claim 7, wherein the transmission mode of the pilot information comprises at least one of a fixed transmission mode or a stepped transmission mode; and
a location of the pilot information on a subcarrier in the illumination frame is fixed in the fixed transmission mode, and a location of the pilot information on a subcarrier in the illumination frame changes according to a preset rule in the stepped transmission mode.

* * * * *

UNITED STATES PATENT AND TRADEMARK OFFICE
CERTIFICATE OF CORRECTION

PATENT NO. : 12,003,462 B2
APPLICATION NO. : 17/668207
DATED : June 4, 2024
INVENTOR(S) : Chenchen Liu et al.

Page 1 of 1

It is certified that error appears in the above-identified patent and that said Letters Patent is hereby corrected as shown below:

In the Claims

In Column 24, In Line 30, In Claim 1, after "information" delete "is used to".

In Column 25, In Line 12 (Approx.), In Claim 4, after "information" delete "is used to".

Signed and Sealed this
Twenty-ninth Day of October, 2024

Katherine Kelly Vidal
*Director of the United States Patent and Trademark Office*